United States Patent Office 2,812,378
Patented Nov. 5, 1957

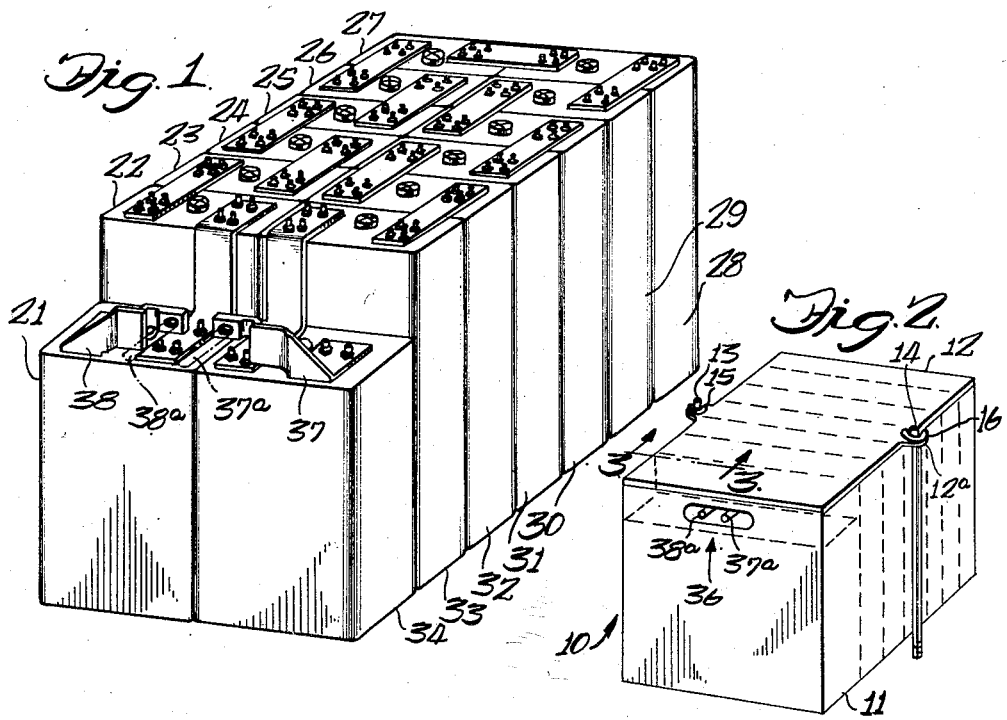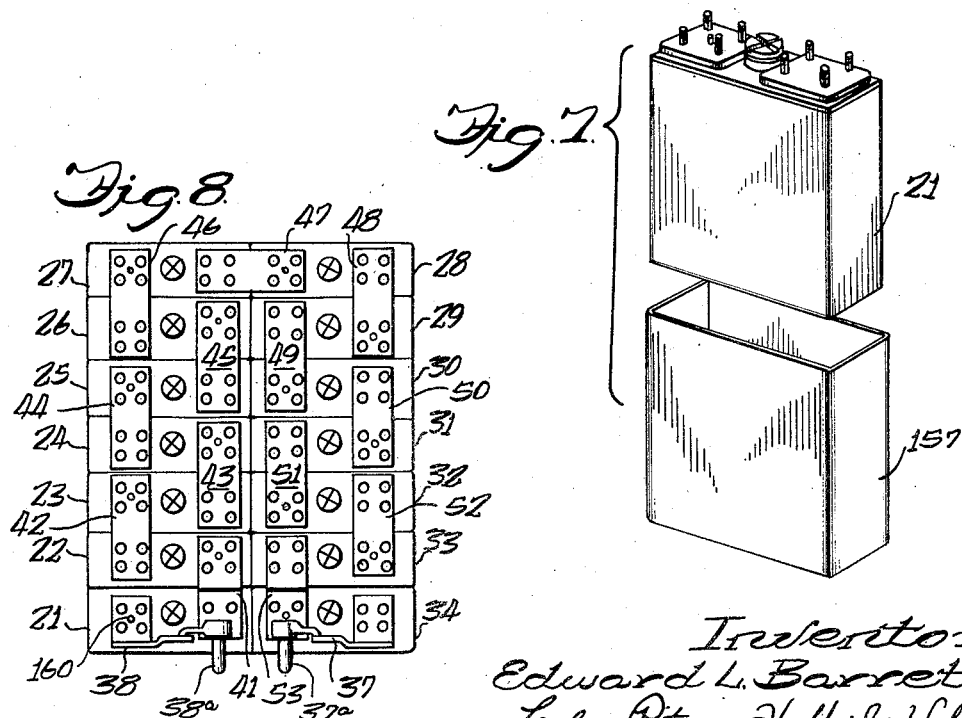

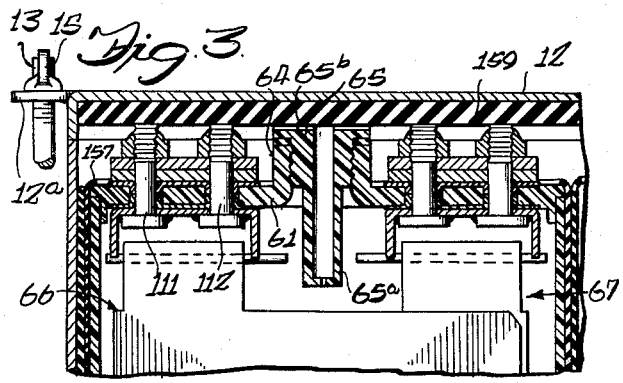
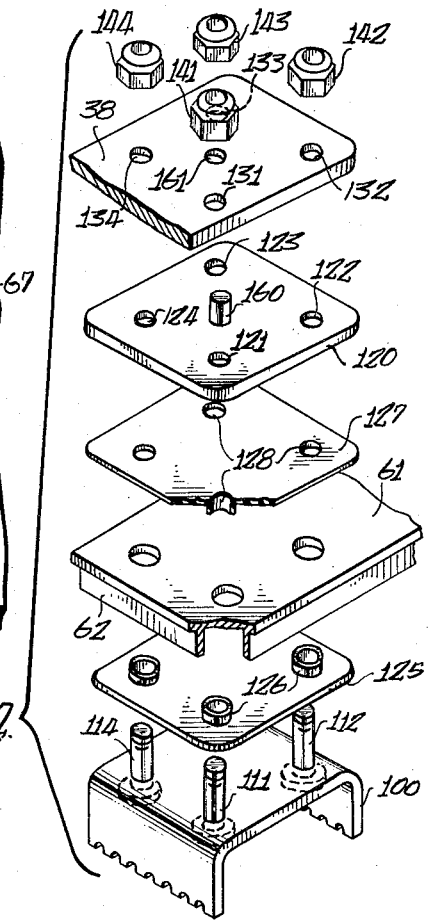
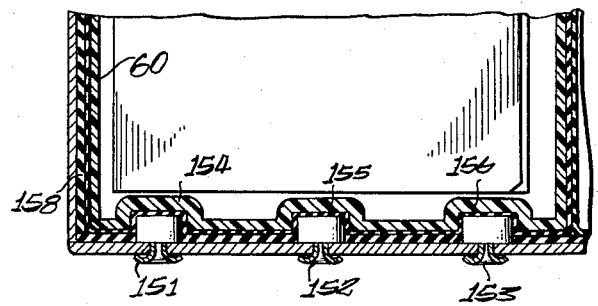
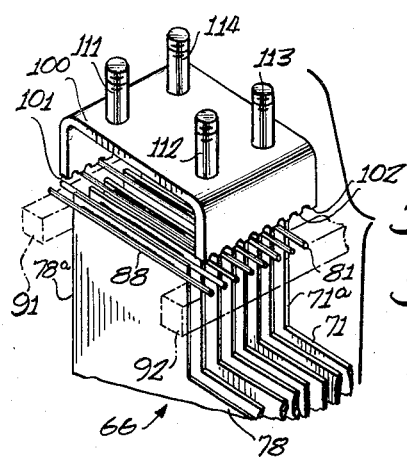
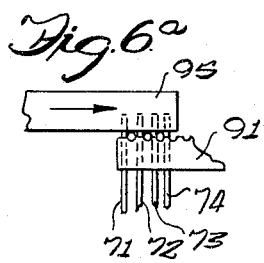

2,812,378

BATTERY CONSTRUCTION

Edward L. Barrett, La Grange, Ill.

Application February 10, 1956, Serial No. 564,792

10 Claims. (Cl. 136—134)

The present invention relates to batteries and more particularly to a high capacity storage battery for use in jet airplanes or the like.

It is an object of the present invention to provide a storage battery having a novel terminal and cell arrangement capable of handling, with high efficiency and without overheating, the large currents required for the operation of jet engine starters as well as the currents which must be passed when the battery is recharged. It is another object to provide a battery having a novel cell and connector strip arrangement which provides maximum cooling of cells, which eliminates cross-over of connector straps, and which provides adequate space for mounting approved types of high amperage external connectors. It is another object to provide a battery which is extremely compact and which permits the head space within the battery housing to be reduced to a point where the battery cover plate may be pressed directly on the tops of the individual cells.

It is a further and related object to provide a battery in which almost the entire cell area may be utilized for active terminal area and in which high average terminal pressures may be achieved with a light duty "spin tight" wrench incapable of developing torque sufficient to damage the cells or cell terminals under field conditions. It is a part of the present invention to provide a battery having separate and removable cells, which is, nevertheless, proof against the common types of damage by service personnel and which includes novel provision for insuring that the cells are properly polarized relative to one another.

It is, moreover, an object to provide a novel terminal assembly having a low resistance but which is capable of use with thin-walled cell casings and which acts to reinforce the top wall of the casing. In one of the aspects of the invention, it is an object to provide a collector arrangement which insures a low resistance connection between the collector and the individual plates as well as a strong anchoring for the plates. It is another object of the invention to provide a procedure for assembling and securing the plates relative to the collector which is rapid and inexpensive and which provides two current flow paths for each of the plates.

It is still another object of the invention to provide a battery having a plurality of individual cells but which is capable of resisting extreme shock and vibration. More particularly, it is an object to provide a battery in which each of the cells is floatingly mounted by resilient rubber or the like yet keyed to the battery housing to prevent bodily shifting of any cell relative to the neighboring cells.

Finally, it is an object to provide a battery which is foolproof and reliable both electrically and mechanically for the most rigorous types of military and commercial use.

Other objects and advantages of the invention will become apparent upon reading the attached detailed description and upon reference to the drawings in which:

Fig. 1 shows in perspective, a group of cells embodying the present invention but with the battery housing removed;

Fig. 2 is an external view of the battery housing;

Fig. 3 is a section taken through one of the cells and looking along the line 3—3 in Figs. 2 and 8;

Fig. 4 is an exploded perspective, in partial section, of a terminal assembly constructed in accordance with the invention;

Fig. 5 shows a plate assembly and collector member;

Fig. 6 shows, in greatly simplified form, a type of jig which may be used to assemble the plates;

Fig. 6a is a fragmentary side elevation of the device in Fig. 6 following assembly of four of the plates;

Fig. 7 is an exploded view showing one of the battery cells and its associated rubber boot;

Fig. 8 is a top view of the interconnected battery cells showing the arrangement of connector straps or jumpers.

While the invention has been described herein in connection with a preferred embodiment, it will be understood that I do not intend to limit the invention to such embodiment but intend, on the contrary, to cover all modifications and alternative forms of the invention which are included within the spirit and scope of the appended claims.

Turning now to Figs. 1 and 2, a battery 10 is shown having a rectangular metallic housing 11, which may be formed of stainless steel or the like, including a cover plate 12. The cover plate is clamped in position by means of clamping rods 13, 14 having wing nuts 15, 16 which press down against suitable ears 12a integrally formed in the cover.

In the discussion which follows the electro-mechanical features and advantages which distinguish the present battery construction are discussed in detail. With regard to the electro-chemical features it will suffice to say that the plates are preferably formed of silver oxide and spongy zinc with an alkaline electrolyte and having an output on the order of about 35 watts per cubic inch for short spaces of time. In a practical battery usable on military aircraft the battery voltage may be on the order of 24 volts and should be capable of supporting a peak current drain up to 1200 amperes. It will be apparent as the discussion proceeds that the features disclosed are applicable to any high output storage battery regardless of the composition of plates or electrolyte.

In the battery disclosed herein a total of 14 cells are used, such cells being numbered 21 to 34 inclusive. The cells are of upright rectangular construction arranged closely side by side in two banks 21–27 and 28–34 so as to fill substantially the entire volume of the housing 11. In accordance with one of the features of the invention all of the cells have approximately the same volume, and hence the same capacity, the end cells 21, 34 being somewhat shorter and thicker than the remaining cells in order to provide space for a two-pole connector generally indicated at 36 and having poles 37, 38 respectively. The poles 37, 38 are connected to the "outside" terminals of the batteries 21–34, and are of L shape terminating in prongs 37a, 38a (Fig. 2) suitable for connection by a mating external connector. For the purpose of interconnecting the cells, connector straps 41–53 are provided. The straps 41, 53, as shown in the drawing, are of Z shape interconnecting the inner terminals of the short cells to the inner terminals of the taller cells adjacent thereto. The remaining connector straps are perfectly flat. Adjacent cells in the series are oppositely polarized and the pattern of connection is repeated throughout all of the cells in the series. Using the cell arrangement shown in Figs. 1 and 8 and with the connector straps connected as shown, it will be apparent that no "cross-over"

or projecting connections are necessary, and all of the straps may be formed of flat stock, preferably silver plated copper. Furthermore, all of the cells are in direct contact with the outside wall thereby promoting uniform dissipation of heat and preventing any one cell from constituting a "hot spot" to limit the capacity of the battery.

Taking the battery cell 21 by way of example it includes a rectangular casing 60 having a top wall 61 provided with a depending flange 62 for reception and sealing within the upper edge of the battery casing. The casing is preferably made of plastic such as polystyrene. Centrally arranged in the top wall 61 is an upstanding filling nozzle 64 which is threaded for reception of a screw cap 65. The screw cap 65, as shown, has a depending breather tube 65a which is sufficiently long as to retain the electrolyte in the battery when the battery is in inverted position.

Included within the battery are two plate assemblies 66, 67 which are interleaved with one another in the usual way and provided with suitable separators. Taking the plate assembly 66 by way of example, it will be noted (Fig. 5) that it includes a series of plates 71–78 inclusive, separated by individual conductor bars 81–88 inclusive. As shown in the drawing the conductor bars are aligned parallel to one another and are soldered to the upper edges of the conducting tab portions 71a–78a of the respective plates.

For rapid and accurate assembly an assembling jig 90 shown in Fig. 6 is used having two supporting members 91, 92 laterally spaced from one another and each having a series of aligned notches 93, 94. During assembly a conductor rod 81 is laid across the supports 91, 92 and the plate 71 is soldered to it. Following this, the plate 72 is stacked in position and soldered to the conductor bar 22. This process is repeated until an assembly having the desired number of plates is built up. As one after another of the rods is added and seated in position they are held in place by progressive movement of elongated retaining members 95, 96 in the form of rigid bars advanced, as shown in Fig. 6a, to prevent the escape of the conductor bars from the notches. If desired, both plate assemblies 66, 67 may be built up progressively and in step with one another simply by providing a corresponding jig arranged adjacent to and properly spaced from the jig 90.

For the purpose of supporting the plate assembly and for leading the electrical connection through the top wall, a collector member 100 is provided. This collector member is formed of a good conducting metal such as silver plated copper and is dimensioned to occupy substantially all of the rectangular area to one side of the screw cap 65, being snugly received between the lateral flanges 62. The collector member is preferably formed in inverted U-shape having downwardly presented edges 101, 102. In accordance with one of the aspects of the invention the edges 101, 102 are serrated, with the individual serrations being spaced to register with the conductor bars 81–88 as shown in Fig. 5. As a final step in making the plate assembly the collector member 100 is seated on the ends of the bars 81–88 and soldered in place. A rigid box-like structure is thereby produced providing at least two low resistance paths for conducting current from each of the plates 71–78.

In accordance with one of the important features of the invention the collector member 100 is provided with a set of upwardly extending threaded studs arranged in a two-dimensional pattern, such studs being passed upwardly through the top of the cell and received in registering openings provided in a contact plate and associated connector strap, the latter members being pressed into intimate and extensive engagement with one another by suitable clamping nuts. In the present instance, the studs, indicated at 111—114 have heads which are silver-soldered within the U-shape collector member 100 as shown in Fig. 3 prior to attaching the plates. Centered above the collector member 100 is a contact plate 120 having holes 121–124 having a tight press fit with the studs 111—114. Interposed between the collector member 100 and the top wall 61 is a sheet of rubber or the like 125 having upwardly flanged openings 126 for fitting over the studs 111, 114 and for resiliently isolating the studs and collector from the top wall. A similar sheet 127 of rubber or the like having flanged openings 128 is sandwiched between the contact plate 120 and the member 61. The length of the flanges on the sheets 125, 127 is approximately half of the thickness of the cover member so that the paired flanges serve as grommets for sealing as well as mechanically isolating the studs relative to the member 61. Because of the press fit between the studs 111–114 and the holes in the contact plate, all of the sandwiched members are maintained firmly assembled even in the absence of any nuts on the studs. The members 100, 120 serve to reinforce the top member and enable the latter to be of relatively thin cross section as shown. For leading current from the contact plate 120, a flat connector strap or jumper, for example, that shown at 138 is provided having holes 131–134. The connector strap is clamped to the contact plate over the entire area of the latter by means of nuts 141–144.

It is one of the features of the present construction that a light duty screw driven wrench, commonly referred to as a "spin tight," may be used for screwing down the nuts 141–144. The use of such a wrench is not only convenient but insures against the application of excessive torque. Furthermore, the use of multiple studs insures that the torque applied to one of the studs is resisted by the remaining studs and distributed over a substantial portion of the cell casing. It is to be particularly noted that the construction avoids the use of the massive studs formerly thought necessary in this application, and consequently, avoids the use of heavy duty wrenches with the danger that the entire terminal assembly may be twisted off relative to the cell casing or otherwise damaged. The danger of cracking a cell casing, with possible release of electrolyte, is avoided. The practical importance of the present construction will be appreciated when it is recalled that batteries of the present design are intended to be used for military purposes in jet airplanes or the like. Their use under conditions of stress frequently produces unintentional damage especially with batteries serviced by untrained personnel.

With regard to the electrical efficiency of the present arrangement, it has been found that the press fit mentioned above provides a low resistance path to the contact plate 120. Current is thus supplied to the connector strap through the contact plate as well as through the nuts 141–144. Applying only screw driver torque to each of the nuts results in a total force which is evenly distributed over the entire area of the contact plate, an area which may be on the order of 1.4 square inches. With all contact surfaces silver plated, it is found that 1500 amperes may be conducted without any objectionable heating. This current capacity is substantially in excess of the maximum current drain normally drawn from the battery cell under the most extreme conditions of use. As a result the connectors remain cool during operation even though severely confined, and the only heat to be dissipated is that which results from the chemical reaction and which is largely transferred from the cell casing to the metallic battery housing.

In accordance with a further feature of the present invention, means are provided for not only cushioning each of the cells relative to the housing and the remainder of cells but for locking or keying each of the cells in position relative to the housing. This keying is achieved as shown in Fig. 3 where it will be noted that the bottom of the battery housing is provided with a set of upwardly extending registering pins, for example, three pins for each of the battery cells, indicated at 151, 152, 153 respectively. The pins are preferably riveted to the casing by spinning over their lower ends as shown. For registering with the pins 151–153, the bottom of the battery casing 160 is provided with indentations 154, 155, 156 which are preferably molded integral with the casing. For cushioning the pins 151–153 relative to the battery casing, the battery cell is provided with a boot 157 formed of rubber or the like (Fig. 7). Such boot serves the additional function of cushioning the cell relative to adjacent cells and of preventing leakage in the event that the cell casing should, for any reason, become cracked. If desired the upper edge of the boot 157 may be cemented to the cover 61 of the cell. Still further cushioning is provided by a liner 158 of rubber or the like covering the sides and bottom of the housing.

In order to maintain the pins 151–153 in registry with the cell casing, the cover plate 12 has rather thick resilient pad 159 formed of rubber or the like which presses downwardly against the upper ends of all of the connector studs when the wing nuts 15, 16 are screwed down. As a result of all of the above it has been found that the battery remains substantially unaffected by anything less than a direct hit. In order to insure venting in spite of contact between the pad 159 and each of the screw caps 65, the screw caps are provided with a pair of intersecting slots 65b.

Since the battery cells are removable from the housing, individual cells may be serviced and replaced. To insure that the replaced cells are properly polarized, especially during maintenance, one of the contact plates of given polarity on each of the cells is provided with an upstanding registering post, for example, as shown at 160 in Fig. 4. Furthermore, each of the connector strips 41–53 has a registering hole 161 at one end only. The alternation of the registering posts is clearly brought out upon inspection of the plan view, Fig. 8.

The present invention is not limited to use with any particular kind of external electrical connector and any desired type of connector may be accommodated in the head space provided above the cells 21, 34. No head space is provided above the remaining cells, as previously noted, so that the space utilization factor is substantially greater than that of conventional batteries.

I claim:

1. In a battery cell the combination comprising a casing having a top member of rectangular configuration, a filling nozzle centered in the top member, positive and negative collector members of flat rectangular construction on the underside of said top member and occupying substantially the entire area on the respective sides of the filling nozzle, each of said collector members having threaded studs arranged in a two-dimensional pattern and extending upwardly therefrom for reception in registering apertures provided in the top member, contact plates arranged above said top member and in alinement with the respective collector members, a first sheet of resilient sealing material interposed between the collector members and the cover member, a second sheet of resilient sealing material interposed between the contact plate and the cover member, said contact plates having holes providing a pressed fit with the upwardly extending studs on the collector member to maintain the parts seated flatly against one another.

2. In a battery cell the combination comprising a casing having a top member, a collector member of flat rectangular construction on the underside of said top member, said collector member having threaded studs arranged in a two-dimensional pattern and extending upwardly therefrom for reception in registering apertures provided in the top member, a contact plate above the top member, means for insulating the contact plate with respect to the top member, said contact plate having holes providing a pressed fit with the upwardly extending studs on the collector member to maintain the parts seated flatly against one another.

3. In a battery cell the combination comprising a casing having a top member of rectangular configuration, a collector member of flat rectangular construction on the underside of said top member, said collector member being of inverted U shape and presenting a pair of spaced downwardly extending serrated edges, a set of battery plates electrically and mechanically secured to said edges, said collector member having a plurality of spaced studs arranged in a two-dimensional pattern and extending upwardly therefrom for reception in registering apertures provided in the top member, and a contact plate on the upper surface of said cover member having an area which is substantially equal to that of the collector member and having holes for reception of said studs.

4. In a high current storage battery the combination comprising a rectangular housing, a plurality of cells of upstanding rectangular construction in said housing each having a top member providing positive and negative terminals at the opposite ends thereof, said cells being arranged flatly against one another in two banks, flat jumper connectors for interconnecting the cells, interfitting polarizing connections on one end only of each of said connectors and on one terminal only of each of said cells to insure proper polarization, the terminal cells in each of said banks being adjacent one another and having the same volume as the remaining cells but being shorter in height, and a two-pole electrical connector arranged above the terminal cells to provide output connections for the battery.

5. In a high current storage battery; the combination comprising a rectangular housing, a plurality of cells of upstanding rectangular construction in said housing each providing a filler opening together with positive and negative upwardly-facing terminals, said cells being arranged flatly against one another in two banks with adjacent cells being oppositely polarized and connected by flat jumper connectors, the terminal cells in each of said banks having substantially the same volume as the remaining cells but being shorter in height, a two-pole electrical connector arranged above the terminal cells, and means in said housing for receiving an external electrical connector.

6. In a high current storage battery for use under conditions of shock and vibration, the combination comprising a rectangular housing, a plurality of removable cells in said housing and occupying substantially the entire volume thereof, each of said cells having upwardly facing terminals interconnected by flat jumper strips so that the cells are electrically connected in series, registering pins secured to the bottom wall of said housing and extending upwardly therein, each of said cells having at least one registering identation for engagement by respective registering pins for preventing lateral movement of the cell in either direction with respect to the bottom wall of the housing, said housing having a cover plate together with means for clamping the cover plate on the housing, and a pad of rubber or the like on the underside of said cover plate for pressing downwardly upon all of the cells when the cover plate is clamped in position ,thereby to maintain the registering pins seated in the registering indentations in the respective cells.

7. In a high current storage battery for use under conditions of shock and vibration, the combination comprising a rectangular housing, a plurality of removable cells in said housing and occupying substantially the entire volume thereof, a layer of resilient material interposed between the cells and between the cells and the housing, each of said cells having upwardly facing terminals interconnected by flat jumper strips so that the cells are electrically connected in series, registering means secured to the bottom wall of said housing and extending upwardly therein, each of said cells having mating registering means on its bottom surface for engagement with the registering means in the housing to prevent lateral movement of the cells in either direction with respect to the bottom wall of the housing, or with respect to each other, said housing having a cover plate together with means for clamping the cover plate on the housing, and a pad of resilient material on the underside of said cover plate for pressing downwardly upon all of the cells when the cover plate is clamped in position thereby to maintain said registering means in engagement.

8. In a high current storage battery cell the combination comprising a metallic collector of flat cross section formed in inverted U shape and presenting a pair of parallel downwardly-facing edge portions, a plurality of plates arranged in a stack spaced from one another and having upwardly extending tab portions having a width which is less than the spacing between the presented edge portions of the collector member, a series of conductor bars sandwiched between the tab portions of the plates and electrically and mechanically secured thereto, the ends of said conductor bars being extended laterally beyond the tab portions of the plates, the presented edges of said collector member being serrated for registered seating of the collector bars in the serrations thereof, said collector bars being electrically and mechanically secured in said serrations to form a rigid box-like collector assembly.

9. In a high current storage battery cell the combination comprising a casing, a metallic collector of flat cross section formed in inverted U-shape and presenting a pair of parallel downwardly-facing edge portions, a plurality of plates arranged in the stack spaced from one another and having upwardly extending tab portions having a width which is less than the spacing between the presented edge portions of the collector member, a series of conductor bars sandwiched between the tab portions on the plates and electrically and mechanically secured thereto, the ends of said conductor bars being extended laterally beyond the tab portions of the plates, the presented edges of said collector member being serrated for registered seating of the collector bars in the serrations thereof, said collector bars being electrically and mechanically secured in said serrations to form a rigid box-like collector assembly, said collector having a plurality of upwardly extending studs arranged in a two-dimensional pattern for projecting through registering openings in the top of said casing for attachment of an external connector thereto.

10. In a high current storage battery the combination comprising a rectangular housing, a plurality of removable cells having casings stacked in said housing and occupying substantially the entire volume thereof, a layer of rubber or the like resilient material interposed between the cells of the housing and between adjacent cells, each of said cells having a pair of terminal assemblies at the respective ends of the cell and upwardly accessible for connecting the cells in series, the terminal assemblies being isolated from the cell casings and sealed with respect thereto by means of grommets formed of rubber or the like, so that the cell casings are floatingly mounted not only with respect to the battery housing but also with respect to the terminal assemblies.

References Cited in the file of this patent
UNITED STATES PATENTS

| | | |
|---|---|---|
| 2,669,595 | Gary, Jr. | Feb. 16, 1954 |
| 2,684,396 | Barrett | July 20, 1954 |
| 2,714,624 | Costa et al. | Aug. 2, 1955 |
| 2,727,082 | Chubb et al. | Dec. 13, 1955 |
| 2,727,083 | Hollman et al. | Dec. 13, 1955 |